J. Hinkley,
Universal Joint.
N°14,159.  Patented Jan. 29, 1856.
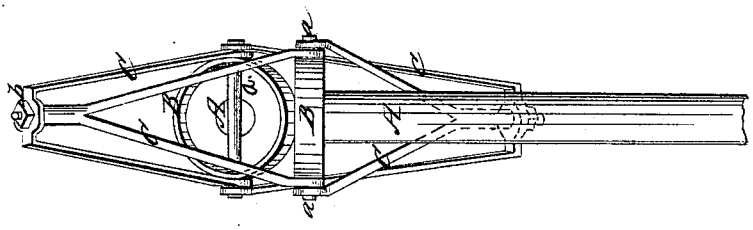
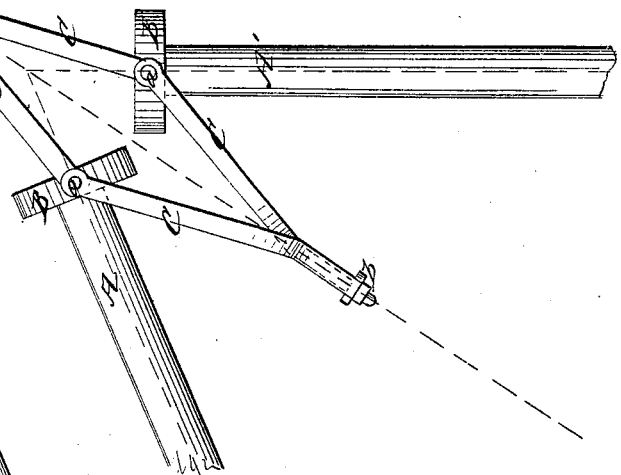
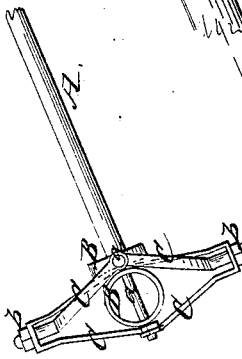

UNITED STATES PATENT OFFICE.

JONAS HINKLEY, OF HURON, OHIO.

UNIVERSAL JOINT FOR CONNECTING SHAFTS, &c.

Specification of Letters Patent No. 14,159, dated January 29, 1856.

*To all whom it may concern:*

Be it known that I, JONAS HINKLEY, of Huron, in the county of Erie and State of Ohio, have invented a new and improved universal-joint connection to be applied to shafts for the purpose of driving or rotating them when placed at varying angles with each other; and I do hereby declare that the following is a full, clear, and exact description of the same, reference being had to the annexed drawings, making a part of this specification, in which—

Figures 1, 2, and 3 are views of two shafts shown in different positions and connected by my improved joint.

Similar letters of reference indicate corresponding parts in the several figures.

The nature of my invention consists in having a pin or rod pass transversely through a hub or boss at the end of each shaft, and having two frames fitted on the ends of each pin or rod on each shaft, the ends of the frames on one shaft being connected to the ends of the frame on the adjoining shaft so that they may turn one within the other as will be presently shown and described.

To enable those skilled in the art to fully understand and construct my invention, I will proceed to describe it.

A, A', represent two shafts on the end of each of which a hub or boss, B, is attached. Each hub or boss has a pin or rod (*a*), passing through it at right angles with the shafts, the ends of the pins or rods projecting a short distance beyond the edges or peripheries of the hubs or bosses. On the ends of the pins or rods (*a*), two frames or cranks C, C, are attached two frames or cranks to each pin. These frames work loosely on the ends of the pins or rods, and the ends of the frames or cranks on one shaft are connected to the ends of the frames or cranks of the adjoining shaft so that one may turn within the other. This is shown clearly in Fig. 3, in which it will be seen that the ends of the frames or cranks on the shaft A', pass through holes in the ends of the frames or cranks on the shaft A, the ends of the frames or cranks on the shaft A', having nuts (*b*), on their ends. The length of the frames or cranks depends on the angle the two shafts form with each other, if the angle is acute the frames or cranks will be longer than if the angle is obtuse, for the connection of the frames or cranks is formed on a diagonal line passing through the angle formed by the two shafts as indicated in red Fig. 2. As one shaft rotates motion will be communicated to the other by means of the frames or cranks the ends of which are allowed to turn one set within the other, the sides of the frames or cranks on each shaft alternately approaching and receding from each other.

The above invention is extremely simple, and is intended to supersede the use of gear wheels as the friction created by gear wheels is avoided, the journals of the shafts are also relieved from all strain or lateral pressure, and consequently are not subjected to the usual wear.

The operation would be the same provided one frame or crank were attached to each shaft, but in this case the journals of the shaft would be subjected to the usual lateral pressure and nearly the same amount of friction would be created.

Having thus described my invention, what I claim as new and desire to secure by Letters Patent, is,

Connecting shafts when placed angularly with each other by means of the universal joints constructed as shown and described by which a rotary motion may be communicated from one shaft to the other.

JONAS HINKLEY.

Witnesses:
R. R. WEBBER,
L. M. DUNBAR.